United States Patent [19]
Hegg

[11] Patent Number: 5,677,795
[45] Date of Patent: Oct. 14, 1997

[54] MODULAR HELMET-MOUNTED DISPLAY

[75] Inventor: Ronald G. Hegg, Vista, Calif.

[73] Assignee: Hughes Aircraft Company, Los Angeles, Calif.

[21] Appl. No.: 370,718

[22] Filed: Jan. 10, 1995

[51] Int. Cl.$^6$ .................................................... G02B 27/14
[52] U.S. Cl. ............................................ 359/630; 359/633
[58] Field of Search .................................. 359/629, 630, 359/631, 633

[56] References Cited

U.S. PATENT DOCUMENTS

| | | |
|---|---|---|
| 4,468,101 | 8/1984 | Ellis . |
| 4,786,966 | 11/1988 | Hanson et al. . |
| 5,200,827 | 4/1993 | Hanson et al. . |
| 5,293,271 | 3/1994 | Merritt et al. .......................... 359/858 |
| 5,299,063 | 3/1994 | Fritz et al. ............................. 359/631 |

FOREIGN PATENT DOCUMENTS 0 599 759 A1  6/1994  European Pat. Off. .

Primary Examiner—Georgia Y. Epps
Assistant Examiner—Thomas Robbins
Attorney, Agent, or Firm—M. W. Sales; W. K. Denson-Low

[57] ABSTRACT

An aviator's helmet-mounted display includes a visor/combiner module (14) which is configured for use with an essentially standard aviator's flight helmet (12). The helmet-mounted display also includes a conformal image source and relay optics (ISRO) module (30) which is removably attachable to the aviator's helmet. This ISRO module (30) projects an image inwardly from outside the visor/combiner module through a transparent window portion (44) thereof and out and inner surface (48) of an angulated transparent viewing portion (18,20) of the visor/combiner module (14). The image is focused at infinity and is partially reflected from the inner surface (48) to an eye (50) of the aviator so that the image is superimposed on the aviator's view of an outside scene viewed through the viewing portion (18,20).

14 Claims, 2 Drawing Sheets

MODULAR HELMET-MOUNTED DISPLAY

BACKGROUND OF THE INVENTION

1. Field of the Invention

The present invention is in the field of helmet-mounted displays. More particularly, the present invention relates to a modular helmet-mounted image display having an image source, relay optics, and a visor/combiner upon which the image is projected for viewing by the wearer of a helmet. The visor/combiner is configured for use with a standard helmet and is used with the helmet whether or not the display system is in use. A modular unit which removably attaches to the standard helmet includes the image source and relay optics configured to first project the image inwardly from outside of the visor and then out an inner surface of the visor for viewing by the helmet wearer in combination with a view of the outside world as seen through the visor.

2. Related Technology

Conventional helmet-mounted displays for pilots include a visor/combiner, relay optics, and an image source all attached to a helmet. In order to provide an aerodynamic shape for the helmet, the image source and relay optics must be integrated within the aerodynamic shell of the helmet. The aerodynamic shape is essential in case the pilot must eject from the aircraft at high speed. This requires a custom helmet which is considerably larger, heavier, more complex and more expensive than the standard helmets used by pilots. In each case where the image source and relay optics are combined into a helmet, if the visor is used as a combiner, then this visor wraps completely around the wearer's face as well as the relay optics, increasing the size and weight of the helmet. On the other hand, if the helmet-mounted display system uses a combiner inside of a visor, then the relay optics must be more fully integrated into the helmet itself, leaving little space between the user's face and these optics. This design alternative also leads to a helmet of increased size and weight.

For uses other than by an aircraft pilot, other types of helmet-mounted displays have been developed. For example, for uses by infantry and other ground troops, a helmet-mounted display may be carried upon or in association with a ballistically protective helmet. This effort has encountered many of the same design constraints already identified in the aerospace field. Although the uses for helmet-mounted displays by ground personnel do not include considerations of aerodynamics like those for a pilot's helmet, these helmets still encounter size, weight, complexity and cost concerns.

For example, a helmet-mounted display is known in accord with U.S. Pat. No. 5,200,827; issued 6 Apr. 1993, to C. M. Hanson, et al. The Hanson patent is believed to disclose a helmet-mounted display in which the visor/combiner or visor with separate combiner screen is integrated with an image source and relay optics into a unit which may be attached to or used in association with a conventional infantry helmet. That is, the display unit may be supported by a head gear which is worn alone or under the helmet. Alternatively, the display may be attached to the wearer's helmet similarly to a flip-up visor. In each case, the display includes the visor/combiner or separate combiner screen, the image source, and relay optics all in a unit. Consequently, the head mounted display taught by the Hanson patent suffers from many of the size, weight and complexity limitations associated with aerospace head mounted displays. A brief perusal of the Hanson patent quickly evidences the complexity inherent with this helmet-mounted display.

Another helmet-mounted aviator's display is known in accord with U.S. Pat. No. 4,468,101, issued 28 Aug. 1984 to S. M. Ellis. According to the disclosure of the Ellis patent, the helmet-mounted display employs an image source and relay optics carried externally of the visor of the helmet. A transparent combiner lens is suspended forwardly of the visor in the user's field of view so that an image projected by the image source and relay optics can be viewed by the user along with a view of the outside world seen through this combiner lens.

With a helmet-mounted display according to the Ellis patent, the disruption in the aerodynamics of the aviator's helmet by external apparatus is apparent. Ejection of the pilot from the fixed-wing aircraft at a high flight speed could be catastrophic with the helmet-mounted display of Ellis. It also appears as though the Ellis device could not be quickly and conveniently detached from the aviator's helmet during emergency conditions immediately before ejecting from an aircraft. Accordingly, a pilot choosing to use this helmet-mounted display might have to do so while accepting the increased risks of injury in the event of an emergency ejection from the aircraft.

SUMMARY OF THE INVENTION

In view of the deficiencies of the conventional helmet-mounted displays, an object for this invention is to provide a modular helmet-mounted display having a helmet-mounted visor/combiner, and an image source and relay optics (ISRO) module which is removably attachable to the helmet.

Another object for the present invention is to provide such a modular helmet-mounted display which is usable with a standard aviator's flight helmet.

Yet another object for this invention is to provide a visor for use with an aviator's flight helmet and which is functional both as a wind-blast protective visor and as a combiner for receiving and presenting to the helmet wearer an image projected inwardly into an interior surface thereof from outside the visor.

Still another object for this invention is to provide an image source and relay optics (ISRO) module for use with such a visor and with provision for removable attachment to an aviator's helmet to project an image inwardly through said visor for display on an inner surface thereof.

Accordingly, the present invention provides a helmet-mounted modular display for use with a protective helmet, the modular display comprising: a visor/combiner module configured for attachment to the helmet to protect at least the eyes of a user who is wearing the helmet, the visor/combiner module having a transparent window portion at one side thereof peripherally adjacent to one eye of the user, and a transparent viewing portion at the opposite side thereof disposed in front of the other eye of the user to allow viewing of a scene therethrough, the viewing portion having an inner surface which is angulated toward the window portion; an image source and relay optics (ISRO) module configured for removable attachment to an exterior surface of the helmet adjacent to the window portion, the ISRO module including a light-emitting image source providing an image, and relay optics projecting the image from the ISRO module inwardly of the visor/combiner module through the window portion thereof and onto the inner surface focused at or near infinity for partial reflection to the other eye of the user; whereby the user sees the image superimposed upon the scene, the ISRO module is separable from the helmet, and the visor/combiner module is usable as a protective visor without use of the ISRO module.

Additional objects and advantages of the present invention will be apparent from a reading of the following detailed description of a particularly preferred exemplary embodiment of the invention, taken in conjunction with the appended drawing Figures.

DETAILED DESCRIPTION OF AN EXEMPLARY PREFERRED EMBODIMENT OF THE INVENTION

Figure 1:
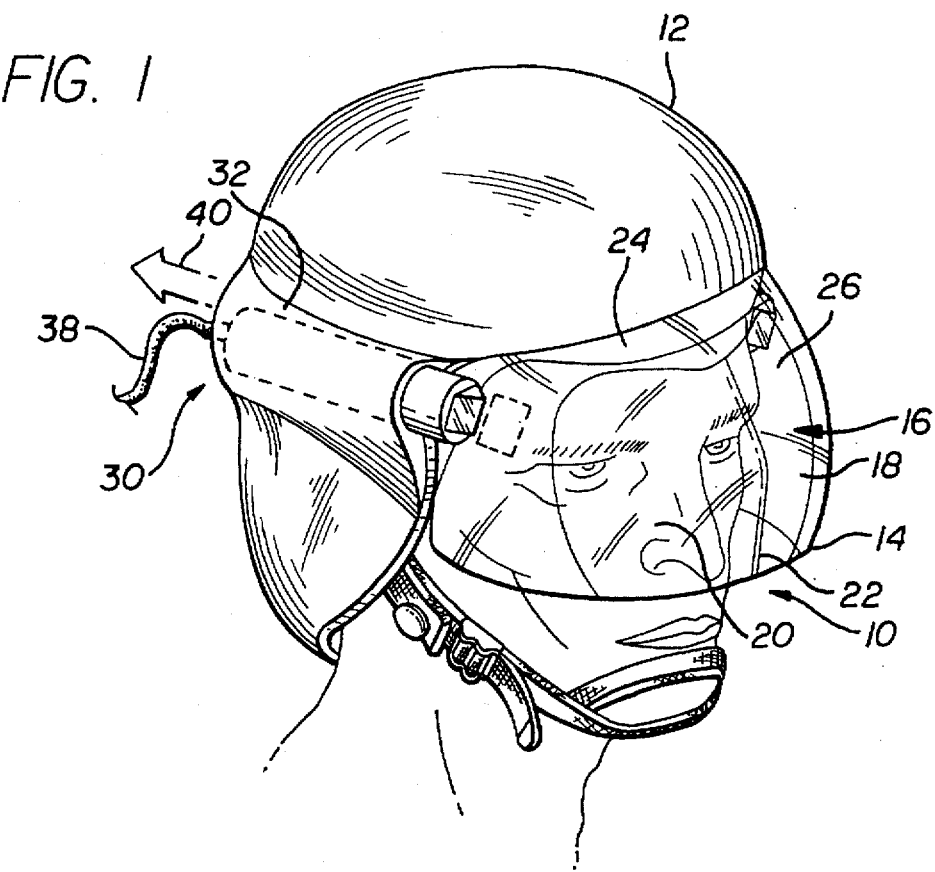
FIG. 1 presents a perspective view of a user wearing a standard aviator's flight helmet fitted with a visor/combiner and with an exteriorly-mounted image source and relay optics (ISRO) module according to the present invention.

Viewing the drawing Figures in conjunction with one another, FIG. 1 shows a user 10 wearing a standard aviator's flight helmet 12. Secured to the flight helmet 12 in place of the standard visor is a transparent visor/combiner 14 according to the present invention. The visor/combiner module 14 includes a central viewing area, generally indicated with the numeral 16. This central viewing area 16 is divided into a left-hand portion 18 and a right-hand portion 20 by a vertically extending central cusp 22. Above, and to each side of the central viewing area 16, the visor/combiner module 14 includes an upper portion 24 and respective left and right side portions 26,28. These upper and side portions 24,26,28 generally replicate the contours of a standard visor (not shown) which would ordinarily be used with the helmet 12, and are smoothly blended into the contours of the visor/combiner 14 including the viewing area 16. Accordingly, the visor/combiner module 14 provides a snug interface with the helmet 12 and wind-blast protection for the user 10 which is generally equivalent to that provided by the standard visor.

Removably attached to the helmet 12 in a temporal position is an image source and relay optics (ISRO) module, indicated with the number 30. This ISRO module 30 includes a protective conformal housing 32 which carries an image source 34 and relay optics, generally referenced with the numeral 36. The housing 32 is removably attached to the helmet 12 so that a rearward pull on a power and signal cable 38 extending therefrom, as is indicated by the arrow 40 in FIG. 2, will separate this housing 32 from the helmet 12.

Figure 2:
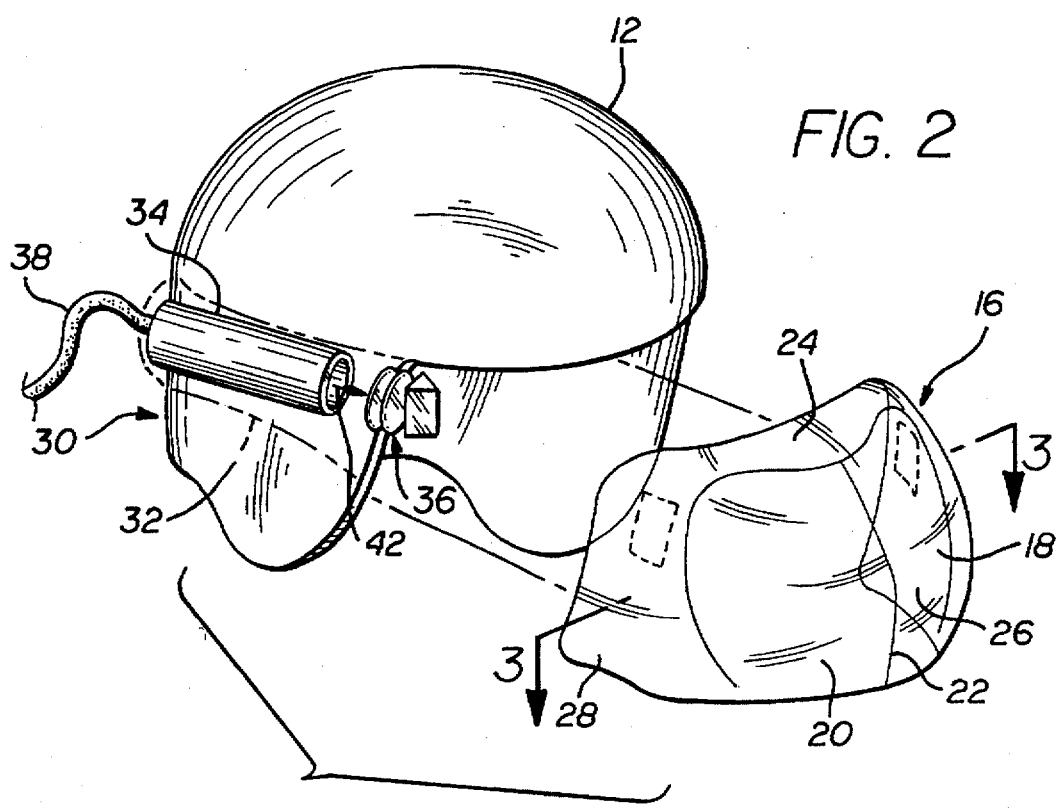
FIG. 2 is an exploded perspective view similar to FIG. 1, showing the aviator's helmet with the visor/combiner in spaced relation and with parts of the image source and relay optics (ISRO) removed or shown in dashed lines for clarity of illustration.

As is seen in FIG. 2, the power and signal cable 38 has connection with the image source 34. This image source may be a small cathode ray tube, for example. Another alterative for the image source 34 is a small vacuum florescent display. Still alternatively, the image source 34 can employ a back-lighted liquid crystal display screen. Those ordinarily skilled in the pertinent arts will be aware of many alternatives for the image source 34. Importantly, the image source 34 is either a light-emitting type itself (such as a cathode ray tube) or includes a light source (such as a back-lighted liquid crystal display) so that the image source projects a light image to the relay optics 36. The image signal for the image source 34 is delivered in electrical form by the cable 38, along with power to operate the image source 34.

As is further depicted in FIG. 2, the image source 34 provides an image which is projected to the relay optics 36, as indicated by arrow 42. The relay optics 36 receive the image and project the image through a respective one of a pair of peripheral window portions 44, each referenced with the number of the visor/combiner 14 for focusing on the opposite side portion 18 or 20 of the visor/combiner. That is, a right-hand module 30 will project an image onto the left-hand portion 18 of the visor/combiner. A left-hand module 30 will similarly project an image onto the right-hand portion 20 of the visor/combiner 14. It will be understood that the helmet 12 may carry a right-hand module 30, a left-hand module 30, or both.

Figure 3:
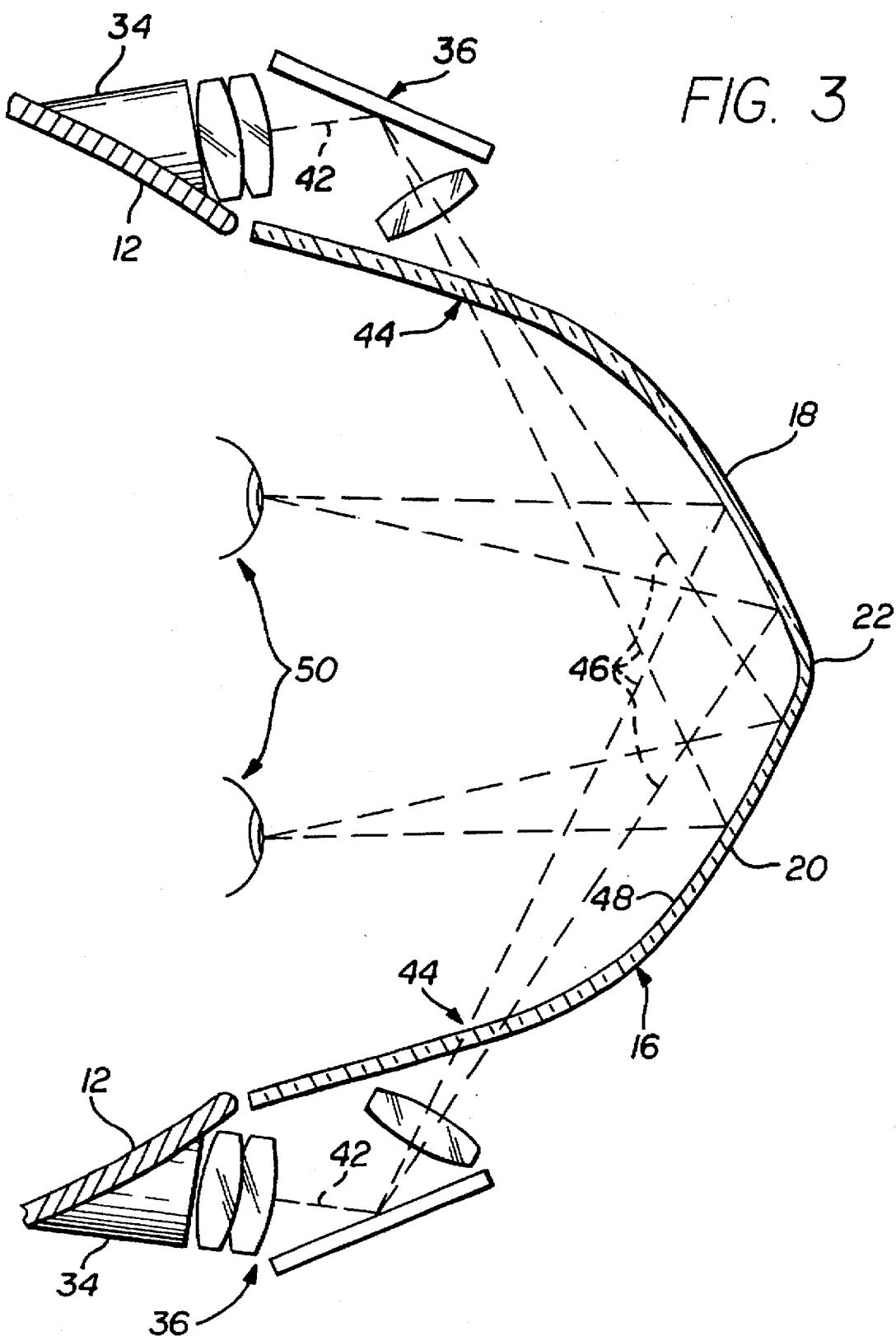
FIG. 3 provides a schematic cross sectional plan view taken generally along line 3—3 of FIG. 1.

FIG. 3 provides a ray-tracing diagram illustrating how the modules 30 are able to project respective images (represented by arrows 46) through the respective window portions 44 and onto the respective viewing portions 18 and 20 of the visor/combiner module 14. Viewing FIG. 3, it is seen that the portions 18 and 20 are respectively angulated toward the opposite window portion 44 so that the projected image (arrows 46) is in part reflected to the user's eyes 50. This "cross over" image projection arrangement allows the visor/combiner 14 to wrap more closely about the user's face, and to match better with the contours of the helmet 12.

This faithfulness of the visor/combiner to the contours of the helmet 12 is important with respect to aerodynamics of the combined helmet and visor/combiner in a pilot ejection situation. It is desirable that the helmet and visor/combiner not subject the user 10 to aerodynamic torques which would be suddenly applied when the user ejects into the airstream around an aircraft. The user 10 is also provided with a view of the outside world through the transparent visor/combiner 14. Consequently, the image (arrows 46) is focused at or near infinity and is superimposed on the view of the outside world which the user 10 sees through the portions 18 and 20 of the visor/combiner 14.

By control of the brightness of the image projected by the ISRO modules 30, the user 10 can achieve a level of contrast which allows the image to be seen, and which does not interfere with the user's view of the outside world. This control of the brightness of the image, as well as the applying of the image signal to the source 34, is effected via cable 38 and by use of electronic control circuits (not shown) connected via this cable to the module 30.

Importantly, it will be appreciated that the ISRO modules 30 are primarily provided with the conformal protective housing 32 simply to protect and house the image source 34 and relay optics 36, and not in order to provide aerodynamic streamlining for this module. In the event that the user must eject from an aircraft in flight, the ISRO modules 30 are quickly and easily detached from the helmet 12 by pulling on the cables 38, as is indicated by arrow 40. The modules 30 may be removably attached to the helmet 12 by use of a dove-tailed channel and pail, for example. Alternatively, a latching device may be used to engage the ISRO modules 30 onto the helmet 12 and can be arranged so that a pull on the cable 38 (or actuation of another release feature) unlatches the latching device.

An advantage of the present invention resides in its ability to be used with an essentially standard aviator's helmet, and to avoid the necessity for large, complex, and expensive helmets with built in helmet-mounted displays. The present invention allows the ISRO modules 30 of the helmet-mounted display to remain with the aircraft for use by various crew personnel, without the necessity of providing each crew member with a complete helmet-mounted display.

On the other hand, in the event that the user 10 is ejected from an aircraft without an opportunity to remove the module 30, the conformal housing 32 is shaped so that it presents a minimal disruption to the aerodynamic contours of the combined helmet and visor/combiner. This situation may arise, for example, if an unconscious crew member is ejected from an aircraft by another crew member. It will be recognized that because of this possibility, the cable 38 may be arranged so that it pulls free or is severed in response to ejection of the user 10.

While the present invention has been depicted and described by reference to a particularly preferred exemplary embodiment of the invention, such reference does not imply a limitation on the invention, and no such limitation is to be inferred. The invention is limited only by the spirit and scope of the following claims, which also provide a definition of the invention, giving full cognizance to equivalents in all respects.

What is claimed is:

1. A helmet-mounted modular display for use with a protective helmet, said modular display comprising:

a visor/combiner module configured for attachment to the helmet to protect at least the eyes of a user who is wearing the helmet, said visor/combiner module having a transparent window portion at one side thereof peripherally adjacent to one eye of the user, and a transparent viewing portion at the opposite side thereof disposed in front of the other eye of the user to allow viewing of a scene therethrough, said viewing portion having an inner surface which is angulated toward said window portion;

an image source and relay optics (ISRO) module configured for removable attachment to an exterior surface of the helmet adjacent to said window portion, said ISRO module including a light-emitting image source providing an image, and relay optics projecting said image from said ISRO module inwardly of said visor/combiner module through said window portion thereof and onto said inner surface focused at infinity for partial reflection to the other eye of the user;

whereby said user sees said image superimposed upon said scene, said ISRO module is separable from said helmet, and said visor/combiner module is usable as a protective visor without use of said ISRO module.

2. The helmet-mounted modular display of claim 1 wherein said visor/combiner module includes a pair of transparent window portions arranged one at each side thereof, and a pair of transparent viewing portions disposed in front of respective eyes of a wearer of the helmet.

3. The helmet-mounted modular display of claim 2 wherein said pair of transparent viewing portions are each angulated toward the respective opposite ones of said pair of window portions, said pair of viewing portions cooperatively defining a vertically-extending cusp therebetween.

4. The helmet-mounted modular display of claim 2 wherein said visor/combiner module also includes an upper portion and respective right-side and left-side portions configured to interface with the helmet to substantially provide wind-blast protection to the wearer of the helmet.

5. The helmet-mounted modular display of claim 4 wherein said right-side and left-side portions of said visor/combiner module each define a respective one of said pair of transparent window portions.

6. The helmet-mounted modular display of claim 1 wherein said ISRO module includes a conformal housing carrying said image source and said relay optics and being adapted for removable attachment to an exterior surface of said helmet.

7. The helmet-mounted modular display of claim 6 wherein said ISRO module further includes a cable extending therefrom, which cable upon the application of a tension force thereto is effective to pull said housing out of attachment with said helmet.

8. The helmet-mounted modular display of claim 6 wherein said display includes a pair of said ISRO modules which are respectively configured for right-side and left-side attachment with said helmet.

9. A method of providing a display to the wearer of a helmet having a visor in front of the wearer's eyes for wind-blast protection, said method including the steps of:

providing said visor with a transparent viewing portion disposed in front of one eye of the wearer of the helmet for providing a view of a scene therethrough, and providing said viewing portion with an at least partially reflective inner surface angulated toward an opposite side of the helmet, providing said visor at said opposite side of the helmet with a side portion configured to interface with the helmet to substantially provide wind-blast protection to the wearer of the helmet, and providing said side portion with a transparent window portion;

externally attaching an image source and relay optics (ISRO) module to an exterior surface of the helmet at the opposite side thereof;

projecting an image from the ISRO module through said transparent window portion across the wearer's face and onto said inner surface of the viewing portion;

at least partially reflecting the projected image from the inner surface to the wearer's one eye focused at infinity;

superimposing said image on the scene viewed by said one eye through said viewing portion.

10. The method of claim 9 further including the step of providing said visor with a pair of said transparent viewing portions each disposed in front of a respective eye of the wearer of the helmet for providing a view of the scene therethrough.

11. The method of claim 10 further including the steps of attaching a pair of said ISRO modules to the helmet, which modules are configured for left-side and right-side attachment to the helmet; and using said pair of ISRO modules to project respective images in opposite directions across the face of the wearer onto the inner surfaces of the opposite viewing portions of said visor.

12. The method of claim 9 further including the step of providing for said ISRO module to be removable from the helmet.

13. The method of claim 12 additionally including the steps of extending a cable from said ISRO module, and releasing the attachment of the ISRO Module to the helmet in response to application of certain tension forces to said cable.

14. A helmet-mounted modular display for use with a protective helmet, said modular display comprising:

a visor/combiner module configured for attachment to the helmet to protect the eyes of a person wearing the helmet, said visor/combiner module having a pair of relatively-angulated transparent viewing portions each disposed in front of a respective eye of the wearer of the helmet to allow viewing of a scene therethrough, said pair of relatively angulated viewing portions defining a forwardly-extending and vertically-extending cusp therebetween, and a continuous upper portion and respective continuous right-side and left-side portions of said visor/combiner module each extending rearwardly from said pair of viewing portions toward the helmet and being configured to interface with the helmet to substantially provide wind-blast protection to the wearer of the helmet, each one of said side portions defining a respective one of a pair of transparent window portions, said pair of viewing portions each having an inner surface angulated toward the one of said pair of window portions on the opposite side of said visor/combiner module;

a pair of image source and relay optics (ISRO) modules each configured for removable attachment to a respective right-side or left-side exterior surface of the helmet adjacent to a respective one of said pair of window portion, each of said pair of ISRO modules including a respective light-emitting image source providing an image and relay optics projecting said image from said ISRO module inwardly of said visor/combiner module through a respective one of said pair of window portions and onto the opposite one of said pair of viewing portion inner surfaces for partial reflection to the respective eye of the user;

whereby said projected images are focused at infinity, and the user sees these images superimposed upon the scene.

* * * * *